(12) United States Patent
Spriggel

(10) Patent No.: US 12,025,172 B2
(45) Date of Patent: Jul. 2, 2024

(54) LOCKNUT

(71) Applicant: Daniel John Spriggel, Henderson, NV (US)

(72) Inventor: Daniel John Spriggel, Henderson, NV (US)

( * ) Notice: Subject to any disclaimer, the term of this patent is extended or adjusted under 35 U.S.C. 154(b) by 0 days.

(21) Appl. No.: 18/426,695

(22) Filed: Jan. 30, 2024

(65) Prior Publication Data

US 2024/0167503 A1 May 23, 2024

Related U.S. Application Data

(63) Continuation-in-part of application No. 18/406,470, filed on Jan. 8, 2024, now abandoned, which is a continuation of application No. 17/300,652, filed on Sep. 13, 2021, now Pat. No. 11,879,494.

(51) Int. Cl.
*F16B 39/34* (2006.01)

(52) U.S. Cl.
CPC .................................. *F16B 39/34* (2013.01)

(58) Field of Classification Search
CPC ....... F16B 39/34; F16B 39/32; Y10S 411/947
USPC .................................. 411/301–303, 299, 947
See application file for complete search history.

(56) References Cited

U.S. PATENT DOCUMENTS

| | | | | |
|---|---|---|---|---|
| 280,690 A | * | 7/1883 | Tracy | F16B 39/34 411/303 |
| 298,843 A | | 5/1884 | Gissinger | |
| 1,791,017 A | * | 2/1931 | Sundh | F16B 39/32 411/929 |
| 1,957,095 A | | 5/1934 | Cole | |
| 2,275,993 A | * | 3/1942 | Robertson | F16B 39/32 411/941 |
| 2,381,206 A | * | 8/1945 | Clayson | F16B 39/32 411/941 |
| 2,556,764 A | * | 6/1951 | Maerlender | F16B 39/32 411/941 |
| 3,280,873 A | * | 10/1966 | Fisher | F16K 1/32 411/941 |
| 3,844,518 A | | 10/1974 | Long | |
| 4,165,194 A | * | 8/1979 | Flower | F16D 1/0835 403/372 |
| 4,248,285 A | * | 2/1981 | Flaig | F16B 39/34 411/222 |
| 4,634,327 A | | 1/1987 | Kowalski | |
| 4,790,229 A | | 12/1988 | Hoshino | |
| 5,098,241 A | | 3/1992 | Aldridge | |

(Continued)

*Primary Examiner* — Flemming Saether
(74) *Attorney, Agent, or Firm* — Fennemore Craig, P.C.

(57) ABSTRACT

A locknut includes a nut body having a threaded through opening therein extending between a first end and a second end. A pocket is defined within the second end of the nut body. A spring member disposed within the pocket includes a pair of leg members joined together by an apex member so that the leg members are disposed in substantially parallel, spaced-apart relation to one another. The leg members define locking surfaces thereon so that when the externally threaded member is threaded into the threaded through opening defined by the nut body the externally threaded member contacts the locking surfaces. The locking surfaces exert pressure on the externally threaded member at substantially opposed radial locations to develop a locking force between the nut body and the externally threaded member.

22 Claims, 16 Drawing Sheets

(56) References Cited

U.S. PATENT DOCUMENTS

| | | |
|---|---|---|
| 5,208,412 A | 5/1993 | Hoshino |
| 5,752,793 A * | 5/1998 | Wu .................. F16B 39/34 |
| | | 411/303 |
| 5,894,641 A | 4/1999 | Hurtz |
| 6,050,766 A | 4/2000 | Kies |

* cited by examiner

LOCKNUT

CROSS-REFERENCE TO RELATED APPLICATION

This application is a continuation-in-part of U.S. patent application Ser. No. 18/406,470, filed on Jan. 8, 2024, now abandoned, which is a continuation of U.S. patent application Ser. No. 17/300,652, filed on Sep. 13, 2021, now U.S. Pat. No. 11,879,494, both of which are hereby incorporated herein by reference for all that they disclose.

TECHNICAL FIELD

The present invention relates to fastener nuts in general and more specifically to locknuts for use with externally-threaded members.

BACKGROUND

Bolts that connect with a nut have been in common use for many years. Frequently the bolt installation is in a machinery environment where the machine is operated by an energy source such as gas or electricity. The machine inherently produces vibration and/or thermal expansion/contraction. This vibration and/or thermal expansion/contraction causes the nut to loosen on the bolt even though it has been tightly installed. This loosening can cause the nut to separate from the bolt which could result in the member that was being held onto the machine to disengage. This disengagement can be dangerous and could cause the machine to fail which could result in injury or death to the human operators.

Another environment where loose nuts can be dangerous is wheel nuts that are used to attach wheels on vehicles. It is said that in the United States that there are multiple vehicle accidents each month due to loose wheel nuts. Obviously in the world that number will be much greater.

To overcome loosening nuts it has been common to use a locknut. There are literally hundreds of different types of locknuts all of which require the tight installation by a separate tool such as a wrench and the use of the same tool to disengage the locknut if disengagement is desired. Some locknuts are destroyed when removed thereby requiring a new locknut to be installed. It would be desirable to permit the locknut to be removable and reinstallable.

The manufacturing cost of most prior art locknuts is substantially greater than conventional non-locking nuts. This increased cost prevents their usage in some environments and especially where a large volume of nuts are to be made. The cost of the locknut of this invention is only about a penny greater than conventional non-locking nuts which does not limit its usage when manufacturing a large volume of nuts.

SUMMARY OF THE INVENTION

One embodiment of a locknut according to the teachings provided herein may include a nut body having a first end and a second end. The nut body defines a threaded through opening therein sized to receive an externally threaded member. The second end of the nut body defines a pocket. A spring member disposed within the pocket includes at least first and second leg members joined together by an apex member so that at least portions of the first and second leg members are disposed in substantially parallel, spaced-apart relation to one another. The first and second leg members define respective first and second locking surfaces so that when the externally threaded member is threaded into the threaded through opening defined by the nut body the externally threaded member contacts the first and second locking surfaces of the first and second leg members. The first and second locking surfaces exert pressure on the externally threaded member at substantially opposed radial locations to develop a locking force between the nut body and the externally threaded member.

Also disclosed is a method of making a lock nut that includes: Providing a nut body blank; forming the nut body blank into a nut body that includes a pocket formed in an end of the nut body; providing a spring member blank; forming the spring member blank into a spring member that includes at least first and second leg members joined together by an apex member so that the first and second leg members are disposed in substantially parallel, spaced-apart relation to one another, the first and second leg members defining respective first and second locking surfaces thereon; and positioning the spring member into the pocket so that when an externally threaded member is threaded into the threaded through opening defined by the nut body the first and second locking surfaces of the spring member press against the externally threaded member at substantially opposed radial locations and develop a locking force between the nut body and the externally threaded member.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figures 1, 2:
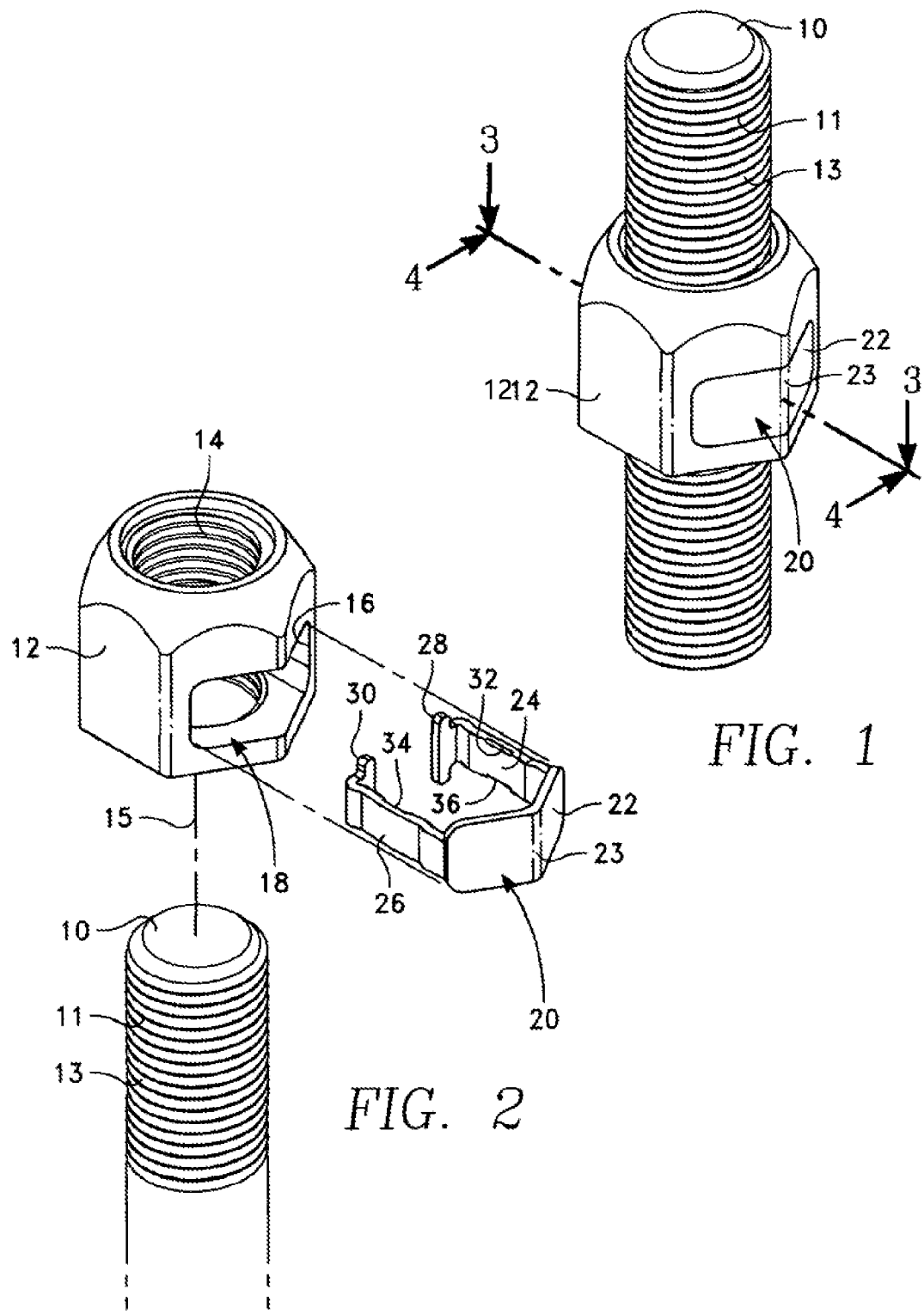
FIG. 1 is an exterior isometric view of the locknut of this invention mounted on a nut which is mounted on a stud.
FIG. 2 is an exploded isometric view showing the locknut disassembled from the nut.
Figure 3:
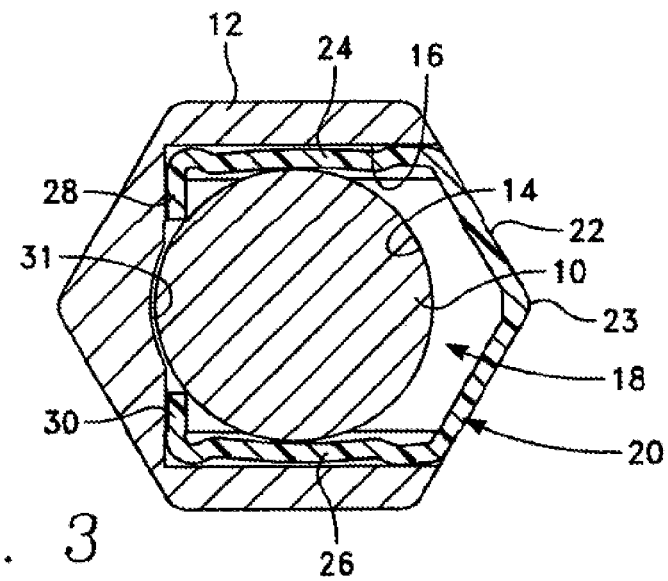
FIG. 3 is a cross sectional view taken along line 3-3 of FIG. 1.
Figure 4:
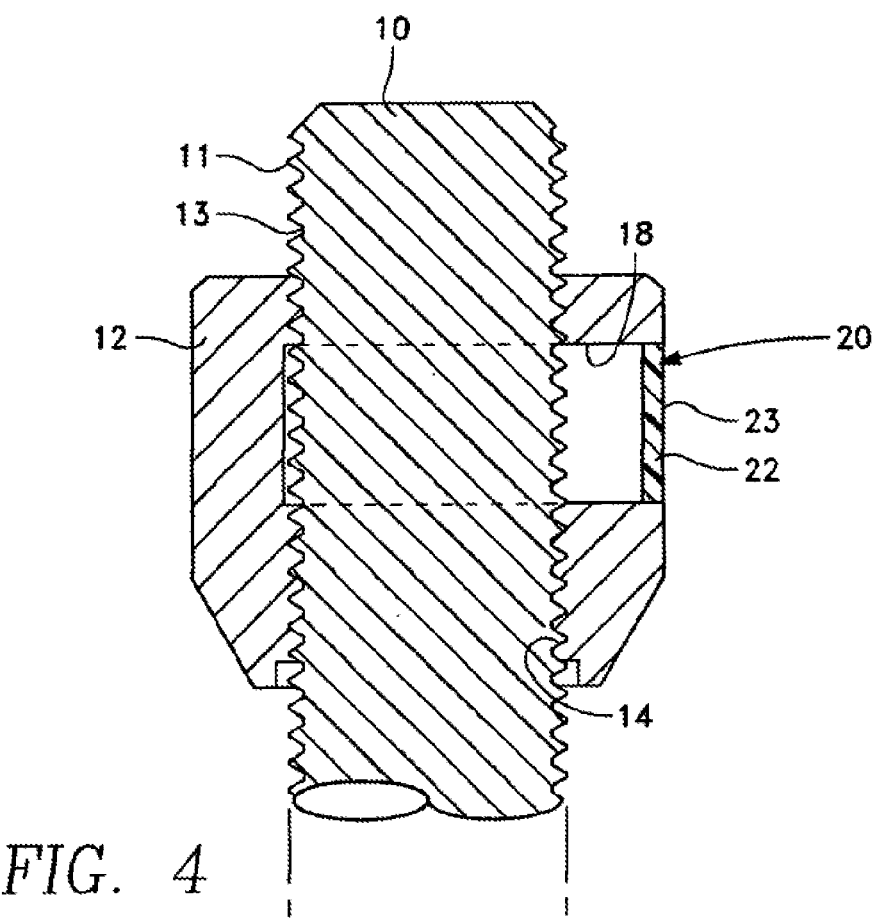
FIG. 4 is a cross sectional view taken along line 4-4 of FIG. 1.

Referring specifically to the drawings there is shown a cylindrical threaded member 10 in the form of a stud. However the member 10 could comprise a screw or a bolt. Studs are in common use for mounting vehicle tire rims (not shown) onto vehicles (not shown) such as automobiles and buses. The threaded member 10 has a series of helical threads where each thread is defined by a pair of spaced apart circular crests 11 and a circular groove 13 located therebetween. The helical threads are slanted slightly relative to the longitudinal center axis 15 of the threaded member 10 which means the crests 11 and groove 13 are really not circular but are close. This slanting can vary but usually is 2, 3 or 4 degrees.

A nut 12 has a central threaded through opening 14 within which the member 10 is to be located. When the member 10 is located at its desired position on the nut 12, it is desired to fix this position preventing unauthorized disengagement. For this purpose the following is utilized.

Nut 12 has an access opening 16 formed in its sidewall. This access opening 16 connects to a pocket 18 which connects to threaded opening 14. A spring member 20 (first embodiment) is to be inserted through access opening 16 and located in a close fitting manner within pocket 18. Spring member 20 has an apex portion 22 which is to be flush with the exterior sidewall of nut 12. Spring member 20 is to be constructed of metal such as stainless steel. Extending from the right side of apex portion 22 and located substantially perpendicular thereto is a right leg member 24. Extending from the left side of apex portion 22 and located substantially perpendicular thereto is a left leg member 26. Left leg member 26 is positioned parallel to right leg member 24. Both leg members 24 and 26 are constructed to have slight inward bowing. Both leg members 24 and 26 are in the form of a flat plate. Apex portion 22 is also flat but has a bend at its center 23. When the spring member 20 is installed in the pocket 18 the apex portion 22 is flush with a pair of joined chamfered surfaces of the nut 12.

The outer end of leg member 24 has attached thereto an end member 28. The outer end of leg member 26 has attached thereto an end member 30. The end members 28 and 30 are located at 90 degrees relative to their leg members 24 and 26. The end members 28 and 30 face each other. The leg members 24 and 26 are narrower than apex portion 22. The height of each of the end members 28 and 30 is the same and is equal to the height of the apex portion 22. When the spring member 20 is inserted into pocket 18 the end members 28 and 30 contact the upper wall and the bottom wall of the pocket 18 preventing any tilting of the leg members 24 and 26 keeping the spring member 22 in a perpendicular relationship relative to the longitudinal center axis 15 thereby eliminating any sloppy movement of the spring member 22. The use of end members 28 and 30 is required because the leg members 24 and 26 rest on the crests of some grooves of the threaded member 10 and are not restrained in any manner except for the end members 28 and 30.

How the spring member 20 gets its spring action is as follows. The spring member 20 is U-shaped. When the spring member 20 is inserted into the pocket 18 the threaded member 10 is then engaged with the through opening 14. The spring member 20 can be inserted either right side up or upside down. The threaded member 10 is slipped over a bevel 32 formed on the upper edge of the inner surface of leg member 24 and at the same time is slipped over bevel 34 formed on the upper edge of the inner surface of leg member 26. These bevels 32 and 34 facilitate the insertion of the threaded member 10. If the spring member 20 is inserted upside down there are bevels also on the lower edge of the inside surfaces of leg members 24 and 26 with only bevel 36 being shown for leg member 24 in FIG. 2 of the drawings. The threaded member 10 causes both leg members 24 and 26 to deflect outwardly decreasing the bowing producing a force pressing on the threaded member 10, hence spring action. By having two leg members 24 and 26 they can work together to press on the threaded member 10. The backsurface of pocket 18 is deformed forming a cutout 31 which is required to provide clearance for the threaded member 10.

Figure 5:
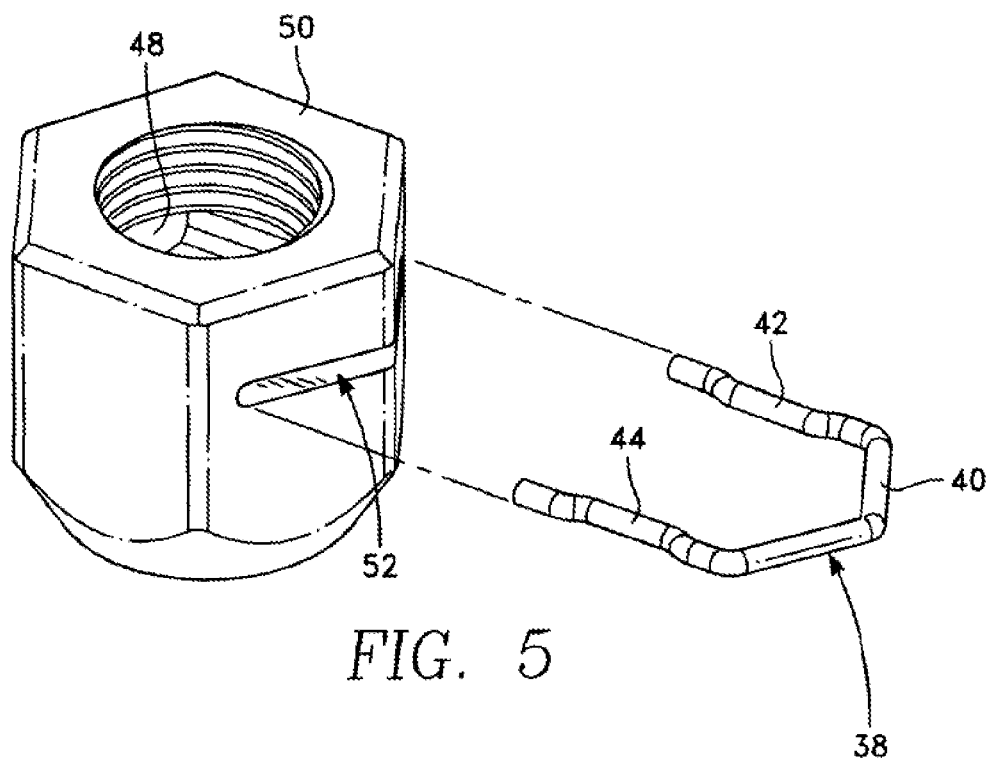
FIG. 5 is an isometric view of the second embodiment of this invention depicting the interconnection with the body of the nut.
Figure 6:
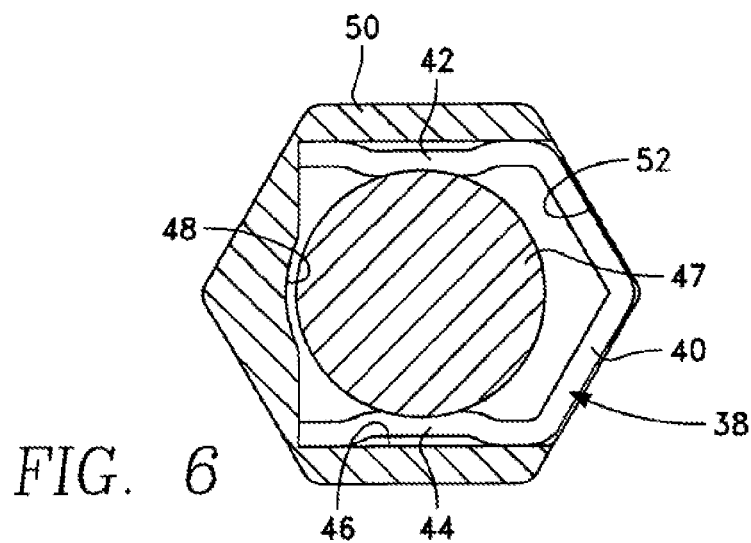
FIG. 6 is a transverse cross sectional view showing the installation of the second embodiment of the invention with the nut.

The previous discussion pertains mostly to the first embodiment of this invention shown in FIGS. 1-4. There is a second embodiment shown in FIGS. 5 and 6. The U-shaped spring member 38 is in the form of a tube. This tube has an apex portion 40 which is connected between leg members 42 and 44. The leg members 42 and 44 are bowed inwardly as is clearly shown in FIG. 5. The diameter of the tube is selected so the tube will rest within a groove of the threaded member 47 shown in FIG. 6. The tube can be solid or hollow. There is no need for end members 28 and 30 that are used in FIGS. 1-4 as the flanks of the groove of the threaded member 46 restrain the spring member 38 and keep it from moving longitudinally. The spring action is achieved in the same way by the threaded member applying pressure against the bowed leg members 42 and 44. The back wall of the pocket 46 includes a cutout 48 which is identical to cutout 31. The cutout 48 is formed in nut 50. The spring member 38 in inserted through access opening 52 into pocket 46. The transverse dimension of access opening is slanted to coincide with the amount of helical offset of the threads located on the threaded member 47. This slanting is necessary so the spring member will fall within a single groove of the threaded member 47.

Figure 7:
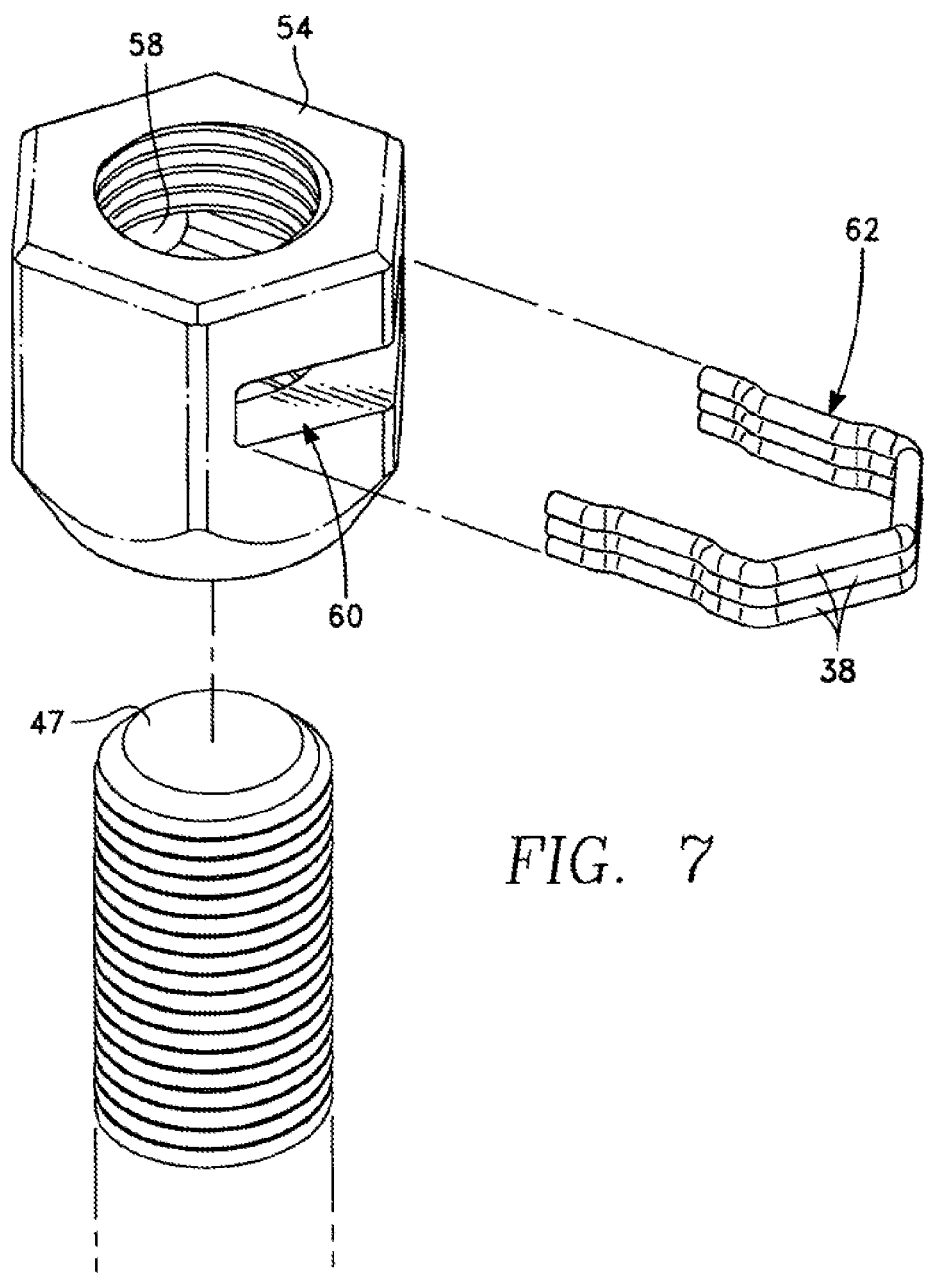
FIG. 7 is an isometric view of the third embodiment of this invention showing a stacked series of second embodiments disengaged from the nut and the threaded member also not engaged with the nut.
Figure 8:
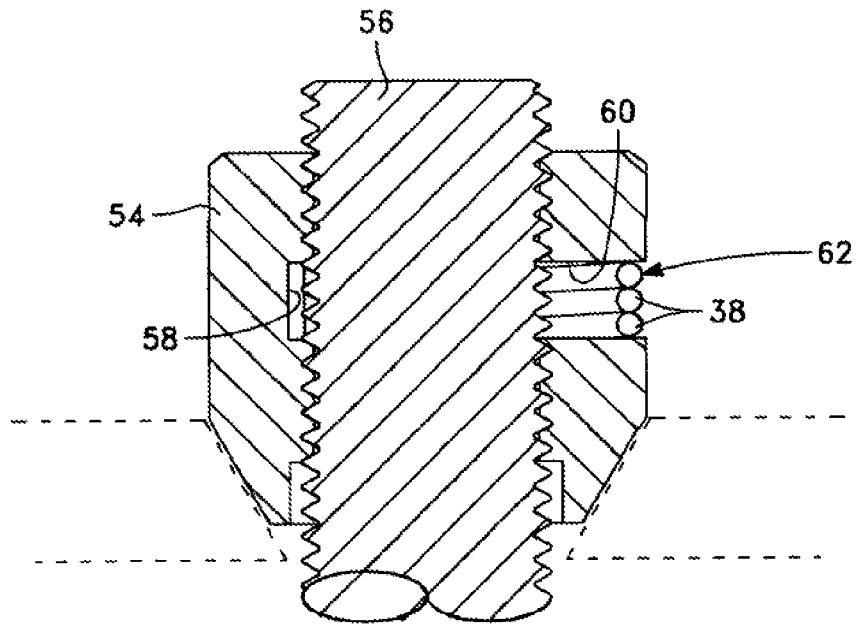
FIG. 8 is a longitudinal cross sectional view of the third embodiment showing the third embodiment installed with the nut.
Figure 9:
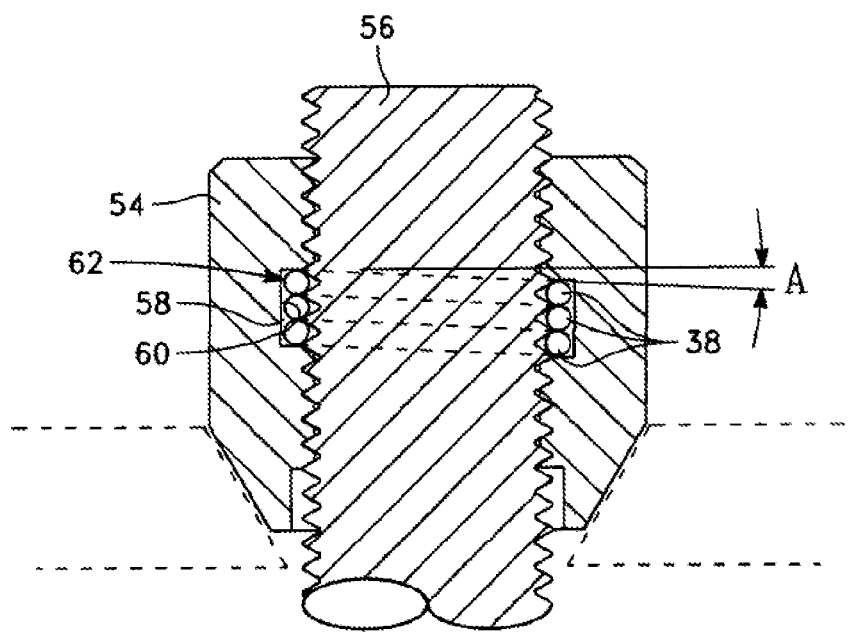
FIG. 9 is a view similar to FIG. 8 but where the cross section is taken at 90 degrees displaced from FIG. 8 and where the nut body is cut away to show how the stacked series of spring members connect with the threaded member.

Referring to FIGS. 7-9 there is shown the third embodiment of locknut of this invention. Nut 54 is threaded on threaded member. Nut 54 includes a pocket 58 and an access opening 60 that provides access to pocket 58. As shown in FIG. 9 access opening 60 is slightly slanted with the amount of slanting equal to the helical angle of the threads of the threaded member 56. The amount of slanting is shown as distance A in FIG. 9. The spring member 62 is composed of a plurality (3 in number shown but could be any number) of spring member tubes 38 mounted in a stacked relationship. Each tube 38 will be located in a separate groove of the threads of threaded member 56. The locking force of the third embodiment is much greater than in the second embodiment and likely will be used in highly vibrational environment.

A fourth embodiment 110 of a locknut according to the disclosed instrumentalities is illustrated in FIGS. 10-15 and may comprise a nut body 112 having a first end 114 and a second end 116. Nut body 112 may define a threaded through opening 118 therein sized to receive an externally-threaded member 120, such as a stud 122. Second end 116 of nut body 112 defines a pocket 124 therein. A spring member 126 (not visible in FIG. 10, but shown in FIGS. 11-15) disposed within pocket 124 is sized to engage externally-threaded member 120 in the manner that will be described in much greater detail below. The engagement of spring member 126 and externally-threaded member 120 results in the development of a locking force that resists loosening of locknut 110.

Figure 11:
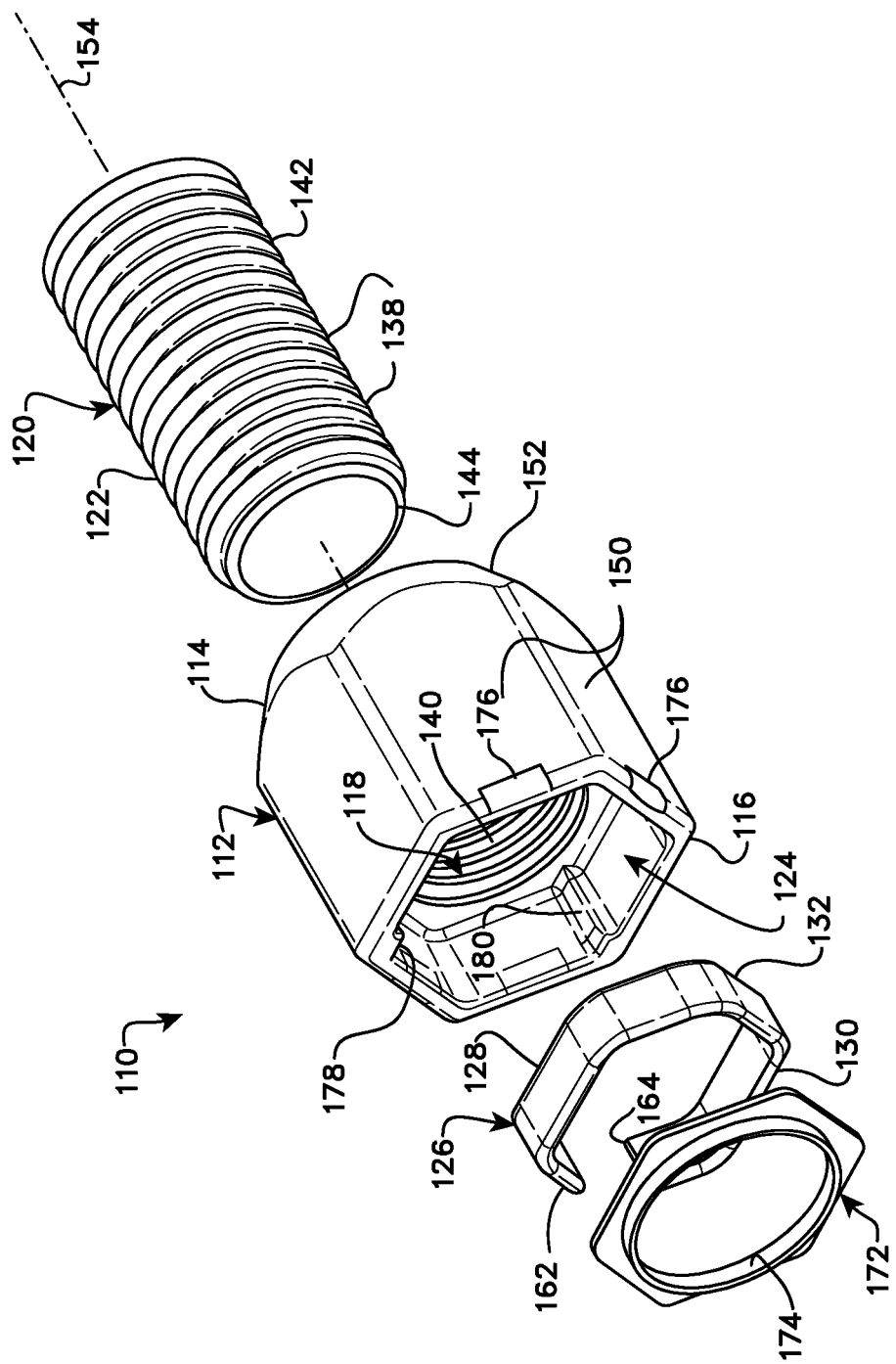
FIG. 11 is an exploded perspective view of the locknut illustrated in FIG. 10.
Figure 12:
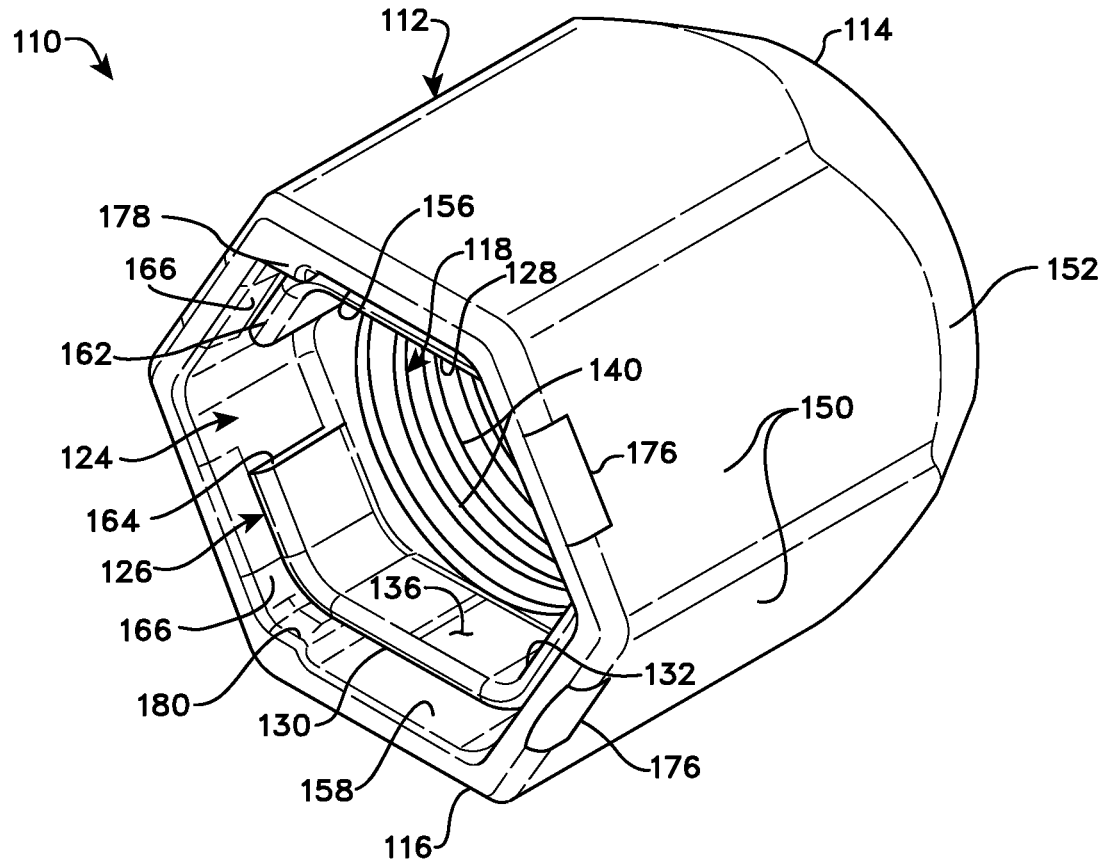
FIG. 12 is a perspective view of the locknut illustrated in FIG. 10 with the externally-threaded member and the shield member removed to more clearly show the details of the pocket and spring member.
Figure 13:
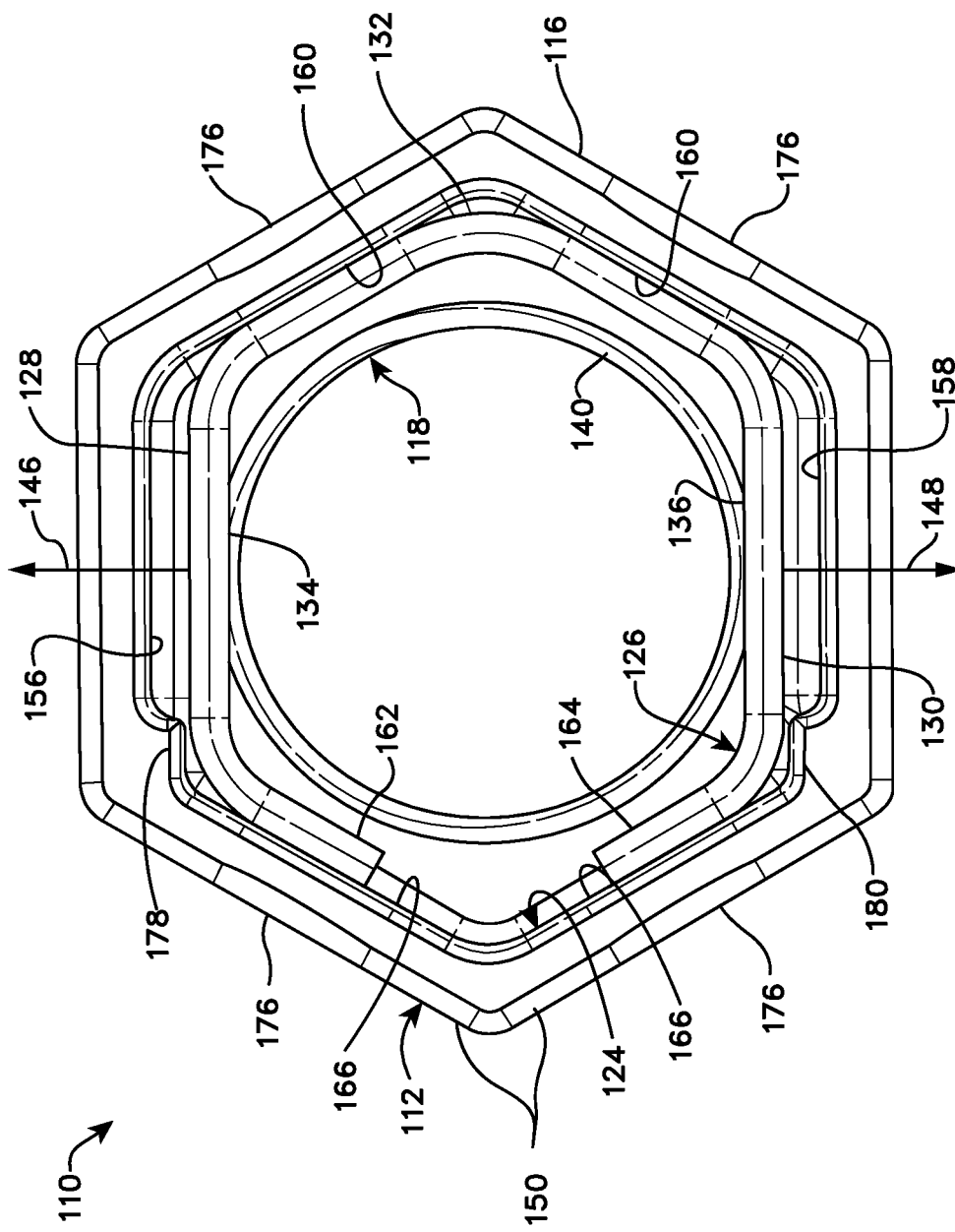
FIG. 13 is an end view of the second end of the locknut illustrated in FIG. 12.
Figure 15:
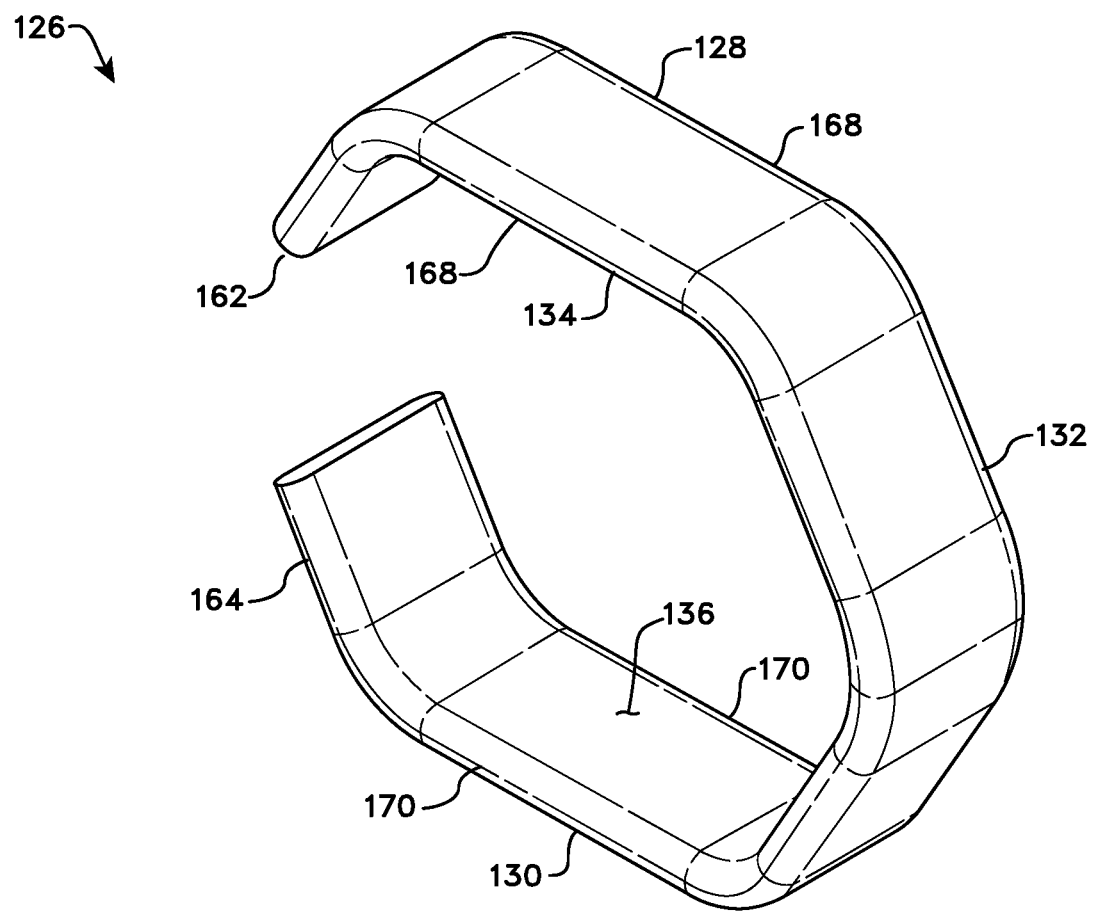
FIG. 15 is an enlarged perspective view of the spring member of the locknut illustrated in FIGS. 10-14.

Referring now primarily to FIGS. 11-13 and 15, spring member 126 may comprise a first leg member 128 and a second leg member 130. First and second leg members 128 and 130 may be joined together by an apex member 132 so that at least portions of the first and second leg members 128 and 130 are disposed in substantially parallel, spaced-apart relation. The inside portions of first and second leg members 128 and 130 define respective first and second locking surfaces 134 and 136, as best seen in FIGS. 13 and 15. When nut body 112 is threaded onto externally-threaded member 120, the first and second locking surfaces 134 and 136 of spring member 126 exert pressure on the externally-threaded member 120 and develop the locking force between the nut body 112 and externally-threaded member 120.

More specifically, as first end 114 of nut body 112 is threaded onto externally-threaded member 120, threads 140 in threaded through opening 118 engage corresponding threads 142 of threaded member 120. Nut body 112 therefore advances on threaded member 120. When distal end 144 of threaded member 120 reaches spring member 126 it will begin to contact the first and second locking surfaces 134 and 136 of the respective first and second leg members 128 and 130, urging them radially apart, i.e., generally in the directions indicated by arrows 146 and 148 (FIGS. 13 and 14), elastically displacing the first and second members 128 and 130 of spring member 126. See FIG. 14. The first and second locking surfaces 134 and 136 remain in contact with externally threaded member 120. The elastic displacement of the first and second members 128 and 130 of spring member 126 will result in a pressure being applied, e.g., via locking surfaces 134 and 136, to the thread crests 138 of externally-threaded member 120. The applied pressure results in the development of a locking force between nut body 112 and threaded member 120, creating a torque, commonly referred to as a prevailing torque, that must be overcome before locknut 10 can rotate on threaded member 120. The prevailing torque reduces or eliminates the tendency of locknut 110 to loosen over time.

A significant advantage of the locknuts according to the teachings provided herein is that they provide locknuts or prevailing torque nuts that address some of the shortcomings and deficiencies of known locknut designs. For example, the disclosed locknuts do not rely on plastic (e.g., nylon) inserts to provide the prevailing torque function, thereby allowing the locknuts to be used in environments and in applications not suitable for nylon insert locknuts. Moreover, the disclosed locknuts may be used repeatedly without loss of the locking function.

Still other advantages are associated with the disclosed spring members. For example, the spring member contact only the crests of the threads of the threaded members, thereby preventing potential damage (such as may be caused by spalling or brinelling) to the flanks and/or roots of the threads of the threaded members. Besides resulting in the more rapid wear of the threaded fastener system, damage to the flanks and/or roots can compromise the structural integrity of the fastener system.

Still yet other advantages of the crest-only contact provided by the disclosed locknuts is that it allows the locknuts to be rapidly threaded (i.e., tightened) and un-threaded (i.e., loosened) on the externally-threaded member (e.g., as is common with the use of pneumatic or electric wrenches) without risk that the spring member will become dislodged or deformed during the tightening or loosening operation. Moreover, the crest-only contact also minimizes wear and potential damage to the spring member (e.g., such as may be caused by spalling or brinelling), thereby allowing the disclosed locknuts to be reused many times without loss of effectiveness or damage to the threaded fastening system.

Still yet additional advantages of the crest-only contact is that performance of the fastener system is not degraded due to the accumulate of particulate matter (e.g., dirt). Because the spring member does not reside within the 'valley' defined by the flanks and root of the threads of the threaded member, accumulated debris are much less likely to result in the failure or degraded performance of the locknut, e.g., due to the distortion or dislodgement of the spring member.

The disclosed locknuts may also be readily and inexpensively manufactured (e.g., by any of a wide range of hot- or cold-working processes known in the art). The spring member may be separately heat-treated (e.g., to provide the desired degree of elastic deformation) before being placed within the pocket of the nut body. Alternatively, in some embodiments, the spring member may be heat-treated together with the nut body after assembly.

Still other advantages are associated with the cooperative relationship of the spring member with the pocket. The pocket holds the spring member in substantially perpendicular relationship with the externally-threaded member, thereby ensuring consistent development of the locking force or prevailing torque over repeated cycles. The consistent orientation of the spring member with the externally-threaded member also allows for the rapid threading or engagement of the nut body and externally-threaded member without risk of damage to the spring member or threads, as explained above, and without the generation of excessive heat during the fastening process that would otherwise occur if spring member were not securely held within the pocket.

Having briefly described the fourth embodiment of the locknut 110 according to the teachings provided herein, as well as some of its more significant features and advantages, various embodiments of the disclosed locknuts will now be described in detail. However, before proceeding with the description, it should be noted that while the locknuts are described as they could be fabricated from certain materials and used as wheel nuts or lug nuts to fasten wheels to hubs of vehicles, the disclosed locknuts are not limited to such materials or applications. To the contrary, the disclosed locknuts may be fabricated from any of a wide range of materials and used in any of a wide range of applications, as would become apparent to persons having ordinary skill in the art after having become familiar with the teachings provided herein.

Figure 10:
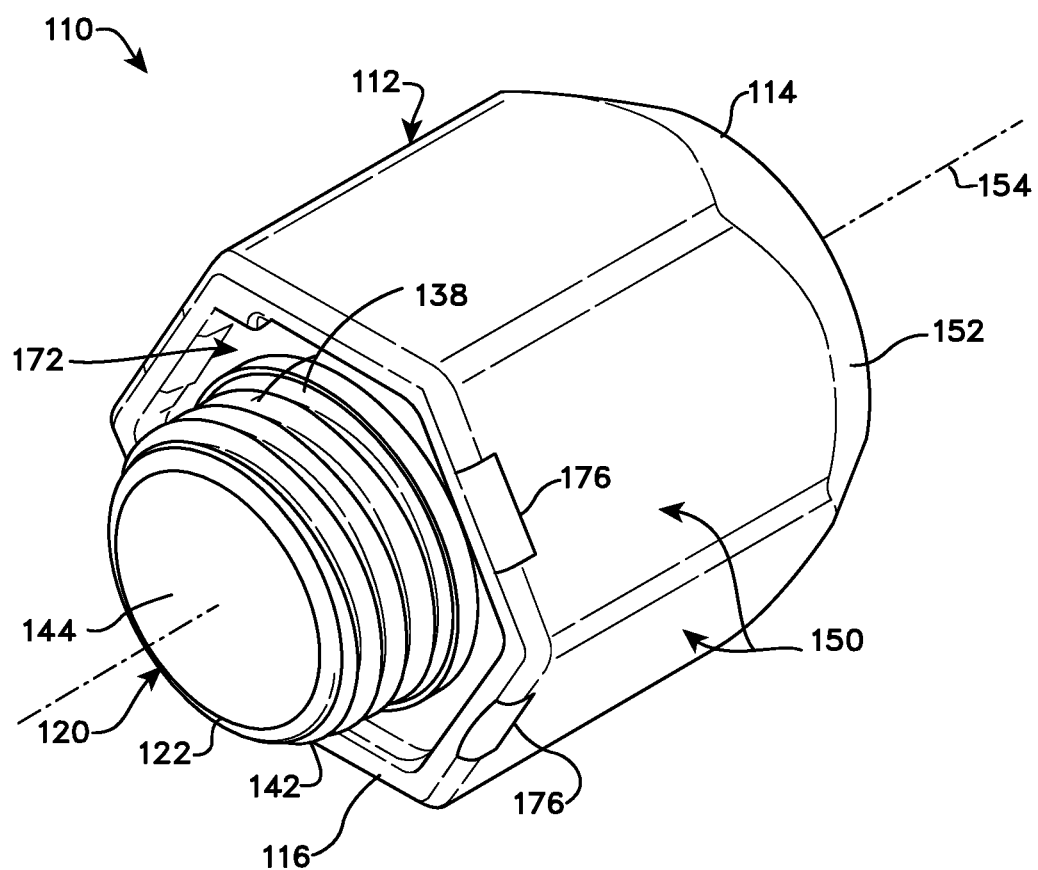
FIG. 10 is a perspective view of a fourth embodiment of a locknut according to the teachings provided herein.

Referring back now to FIGS. 10-15, the fourth embodiment 110 of a locknut according to the disclosed instrumentalities and teachings provided herein may comprise a nut body 112 having a first end 114 and a second end 116. Nut body 112 defines a threaded through opening 118 therein that is sized to receive an externally-threaded member 120, such as a stud 122, as best seen in FIG. 11. Alternatively, any other type of externally-threaded member, such as a screw or bolt, may be used as well. Nut body 112 may define a plurality of faces or sides 150 as is known to allow a wrench or socket (not shown) to tighten or loosen locknut 110, as the case may be. In the particular embodiments shown and described herein, nut body 112 may be generally hexagonally-shaped, defining six (6) sides 150. Alternatively, nut body 112 may define a greater or fewer number of sides, as is well-known in the art. Consequently, nut body 112 should not be regarded as limited to nut bodies defining any particular number of sides 150.

Depending on the particular application and intended use, the first end 114 of nut body 112 may be plain, flanged, or beveled. In the particular embodiments shown and described in FIGS. 10-15, locknut 110 is configured for use a wheel nut or lug nut of the type used for fastening vehicle wheels to studs provided on vehicle axle flanges (not shown). In such an application, first end 114 of nut body 112 may comprise a tapered or beveled surface 152, as beveled nuts are commonly used in such applications. However, in other instances, first ends 114 of locknuts 110 used as wheel nuts or lug nuts may be flanged, as illustrated in FIGS. 16-20. However, since the particular configuration of the first end 114 of nut body 112 may differ depending on a wide range of factors, including intended use, and because the particular configuration of the first end 114 of nut body 112 is not necessary to the functioning of locknut 110, the particular configuration of the first end 114 of nut body 112 will not be described in further detail.

Second end 116 of nut body 112 defines a pocket 124 that is sized to receive spring member 126. More specifically, pocket 124 is sized and configured not only to receive spring member 126 but also to maintain spring member 126 within pocket 124 so that the first and second leg members 128 and 130 are maintained in substantially parallel, spaced-apart relation with respect to a longitudinal axis 154 of threaded member 120 when threaded member 120 is engaged with nut body 112. See FIG. 14. Pocket 124 may be provided with a pair of enlarged or recessed areas 156 and 158 to allow the first and second leg members 128 and 130 of spring member 126 to be deflected generally outwardly, i.e., in the directions indicated by arrows 146 and 148, when the externally-threaded member 120 is threaded into nut body 112. Pocket 126 is also sized to slidably receive and hold apex member 132 against mating surfaces 160, again to assist in retaining spring member 126 within pocket 124 and also to assist in holding the first and second leg members 128 and 130 so that they remain in generally parallel-spaced apart relation to one another and to longitudinal axis 154 of externally-threaded member 120. Accordingly, and in the particular embodiment illustrated in FIGS. 10-15, pocket 124 may comprise a generally hexagonally-shaped opening. Alternatively, other configurations or shapes could be used, some of which are described herein and others of which will become apparent to persons having ordinary skill in the art after having become familiar with the teachings provided herein. Consequently, the present disclosure should not be regarded as limited to pockets having any particular configuration or shape.

Nut body 112 may be manufactured from any of a wide range of materials, such as metals and metal alloys, that are well-known in the art or that may be developed in the future that are or would be suitable for the particular application. Consequently, the locknuts should not be regarded as limited to nut bodies made of any particular material.

Nut body 112 may be manufactured from a suitable nut body "blank," such as wire or rod stock, in accordance with any of a wide range of fabrication processes, such as hot forming or cold forming processes (e.g., forging), that are well-known in the art or that may be developed in the future that are or would be suitable for forming nut body 112. Consequently, nut body 112 should not be regarded as limited to formation by any particular process. However, by way of example, in one embodiment, nut body is fabricated from rod stock in a cold forging process. Threads 140 may be formed in nut body 110 by any of a wide range of processes, such as cutting or rolling, well-known in the art or that may be developed in the future that are or would be suitable for forming threaded through opening 118 in nut body 112. Nut body 112 may also be provided with a suitable surface finish, plating, or coating, as would become apparent to persons having ordinary skill in the art after having become familiar with the teachings provided herein.

Referring now primarily to FIGS. 11-15, spring member 126 develops the locking force or prevailing torque required to maintain the engagement of locknut 110 with threaded member 120, i.e., to prevent locknut 110 from freely turning on externally-threaded member 120. Spring member 126 does this by applying pressure to the thread crests 138 of externally-threaded member 120. As mentioned earlier, the crest-only contact provided by locknut 110 is in contrast to other types of locknuts which may apply pressure to other elements of the threads 142 on externally-threaded member 120, such as the roots or the flanks of the threads 142, either separately or in addition to pressure on the crests 138. As already mentioned, by applying pressure to the thread crests only, locknuts according to the disclosed instrumentalities avoid the risk of damaging the threads 142 of externally-threaded member 120, e.g., by spalling or brinelling, during engagement and disengagement of nut body 112. The crest-only contact also avoids or minimizes the likelihood that the locknut 110 will compromise other structural attributes of externally-threaded member 120, such as yield strength or fatigue resistance.

Figure 14:
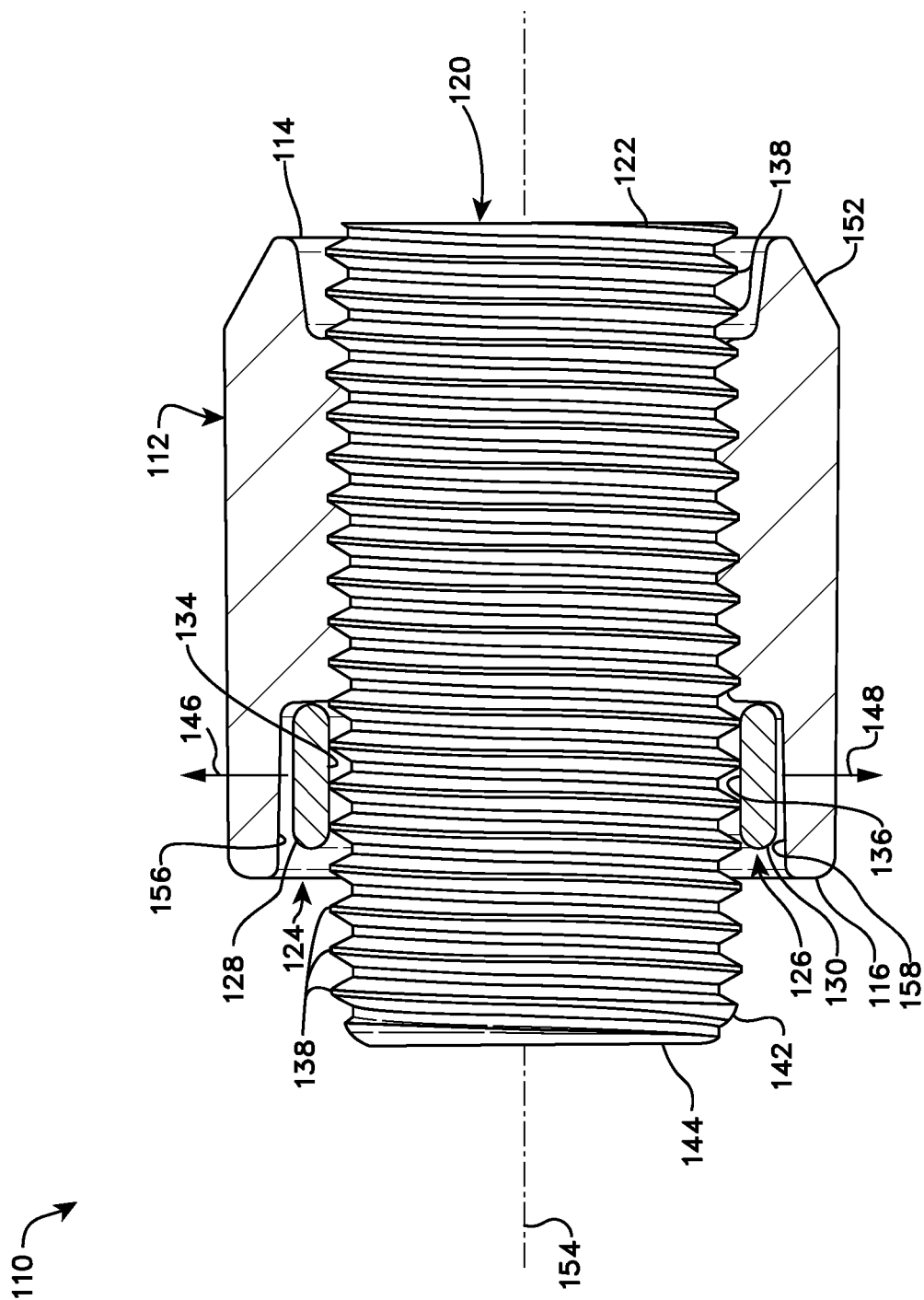
FIG. 14 is a sectional view of the locknut illustrated in FIG. 10 showing the engagement of the externally threaded member and locking surfaces of the spring member.

In the particular embodiment illustrated in FIGS. 10-15, spring member 126 may comprise a first leg member 128 and a second leg member 130 that are joined together by an apex member 132. The arrangement is such that at least portions of the first and second leg members 128 and 130 are disposed in substantially parallel, spaced-apart relation to one another. As mentioned earlier, inside portions of first and second leg members 128 and 130 define respective first and second locking surfaces 134 and 136, as best seen in FIGS. 14 and 15.

The spacing or distance between the first and second locking surfaces 134 and 136 will vary depending on the particular size, i.e., diameter, of threaded member 120. It will also vary depending on the stiffness of spring member 126 and the desired magnitude of the prevailing torque that is to be provided. Consequently, the disclosed instrumentalities should not be regarded as limited to any particular spacing or distance between the first and second locking surfaces 134 and 136.

Spring member 126 may also comprise a first end member 162 extending from the first leg member 128 and a second end member 164 extending from second leg member 130. First and second end members 162 and 164 are sized to be slidably received by mating surfaces 166 provided in pocket 126, as best seen in FIGS. 12 and 13. When first and second end members 162 and 164 are provided, pocket 124 may also be provided with first and second protrusions 178 and 180, as best seen in FIGS. 12 and 13. The engagement of first and second end members 162 and 164 with mating surfaces 166, as well as first and second protrusions 178 and 180, if provided, assists in retaining spring member 126 within pocket 124 and also assist in holding the first and second leg members 128 and 132 of spring member 126 so that they remain in generally parallel-spaced apart relation to one another and to the longitudinal axis 154 of threaded member 120 when threaded member 120 is threaded into nut body 112. See FIG. 14.

Figure 20:
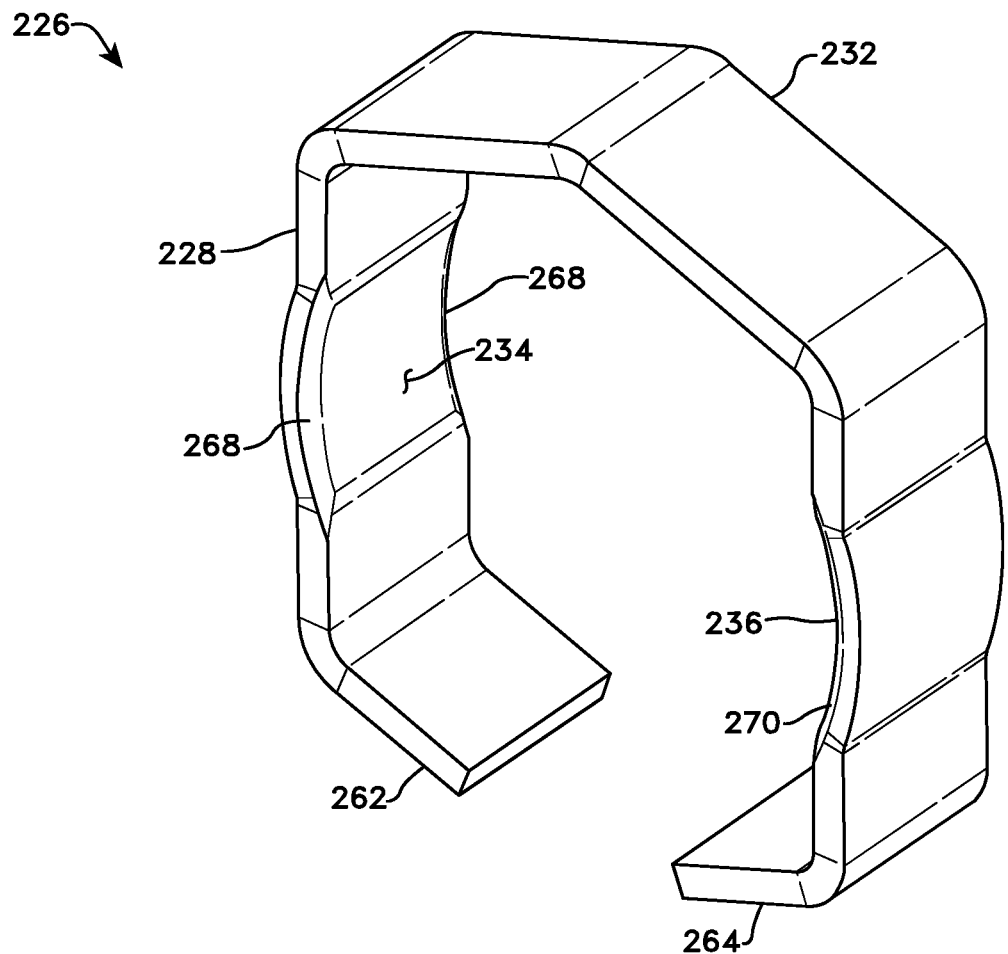
FIG. 20 is an enlarged perspective view of the spring member having curved locking surfaces.

With reference now primarily to FIGS. 14 and 15, the first and second locking surfaces 134 and 136 are provided with respective relieved edge portions 168 and 170. The relieved edge portions 168 and 170 provide a lead-in for externally-threaded member 120 to promote the smooth and even elastic deflection of the first and second locking surfaces 134 and 136 as externally-threaded member 120 is threaded into nut body 112. Relieved edge portions 168 and 170 also reduce the tendency of the spring member 126 to bind or otherwise be moved out of position during the engagement process, thereby allowing rapid threading and un-threading of nut body 112 on threaded member 120. In the particular embodiment shown in FIGS. 10-15, the relieved edge portions 168 and 170 comprise curved or radiused edged portions. In other embodiments, the relieved edge portions 168 and 170 may be beveled, as shown in FIG. 20 for spring member 226.

Regardless of how the relieved edge portions 168 and 170 are provided, it is generally preferred, but not required, to provide them on both sides of spring member 126 so that either side of spring member 126 may be inserted first into pocket 124. Spring member 126 may be axially retained within pocket 124 by mechanically deforming (e.g., by swaging or staking) at least portions 176 of the second end 116 of nut body 112, as best seen in FIG. 10.

Spring member 126 may be fabricated from any of a wide range of materials, such as metals or metal alloys, suitable for the particular application and that would provide (e.g., after suitable heat treatment) the required elasticity or "springiness" (i.e ability to substantially elastically deform). Consequently, the present invention should not be regarded as limited to spring members fabricated from any particular type of material.

Spring member 126 may be formed by any of a wide range of processes, such as hot forming and cold forming processes, and from any of a wide range of starting material blanks or forms (e.g., wire, rod, or flat stock). By way of example, in one embodiment, spring member 126 by rolling wire stock material to form a flattened member having a generally rectangualarly-shaped cross-section with rounded or radiused edges, substantially as shown in FIGS. 14 and 15. When formed from such wire or rod stock material, the relieved edge portions 168 and 170 of respective first and second locking surfaces 134 and 136 will be rounded or radiused, thereby providing the desired lead-in function described earlier. In embodiments wherein spring member 126 is formed from flat stock material with substantially square edges, it may be necessary to provide a bevel (such as that shown in FIG. 20 for spring member 226) on the edge portions 168 and 170 of locking surfaces 134 and 136 to provide the desired lead-in.

If heat treatment is required or desired, spring member 126 may be heat treated after being formed (i.e., as a separate piece). Alternatively, spring member 126 may be heat treated along with nut body 112, after having been placed within pocket 124 of nut body 112.

In some embodiments, locknut 110 may also comprise a shield member 172 sized to be received by pocket 124. See FIGS. 10 and 11. Shield member 172 may define a central opening 174 therein sized to pass distal end 144 of externally-threaded member 120. If provided, shield member 172 axially retains spring member 126 within pocket 124. Shield member 172 itself may be axially retained within pocket 124 by mechanically deforming (e.g., by swaging or staking) at least portions 176 of the second end 116 of nut body 112, as best seen in FIG. 10.

Locknut 110 may be made by providing a nut body blank. Nut body blank may comprise a length of wire or rod stock (not shown). The nut body blank may then be formed into nut body 112 having a first end 114 and a second end 116, substantially as shown in FIGS. 10-15. As mentioned earlier, nut body may be formed by any of a wide range of processes, such as hot forming or cold forming processes. Depending on the application, first end 114 of nut body 112 may be plain, flanged, or tapered. The second end 116 of nut body 112 is formed to define pocket 124 therein. The threads 140 in through opening 118 may be formed by a suitable process, such as thread cutting or thread rolling.

Spring member 126 may be made by providing a spring body blank. Spring body blank may comprise a length of wire or rod stock (not shown). In other embodiments, spring body blank may comprise a length of flat stock. If wire or rod stock is provided, the wire or rod stock may be formed (e.g., by rolling) into a flat piece or spring blank having a substantially rectangularly-shaped cross-section, such as that illustrated in FIGS. 14 and 15. In most forming processes, the use of wire or rod stock will typically result in a flat spring blank having curved or radiused edges 168 and 170, again as best seen in FIGS. 14 and 15. If flat stock is used, it may be necessary to provide suitable bevels or chamfers (such as those illustrated in FIG. 20 for spring member 226) in edge portions 168 and 170 to provide the desired lead-in for threaded member 120.

In any event, after the flat piece or spring blank is formed, it may be bent or formed into the configuration shown in FIGS. 11-15 with two opposed leg members 128, 130 connected or joined together by apex member 132. End members 162 and 164 may comprise extensions of leg members 128 and 130. Spring member 126 is sized to be slidably received by pocket 124, and more particularly mating surfaces 160 and 166 of pocket 124, as best seen in FIGS. 12-14. Recessed areas 156 and 158 of pocket 126 allow leg members 128 and 130 to be elastically displaced, i.e., in the directions indicated by arrows 146 and 148 when nut body 112 is threaded onto externally-threaded member 120.

After being so formed, spring member 126 may be heat treated (if required or desired) before being positioned within pocket 124 of nut body 112. Alternatively, spring member 126 may be heat treated after being positioned within nut body 112. In any event, after spring member 126 is positioned within pocket 124 of nut body 112, it may be axially retained within nut body by mechanically deforming at least portions of the second end 116 of nut body 112 in the manner already described. If a shield member 172 is provided, then shield member 172 may be positioned within pocket 124 of nut body 112 before mechanically deforming the second end 116 of nut body 112.

A fifth embodiment 210 of a locknut according to the disclosed instrumentalities is illustrated in FIGS. 16-20. Fifth embodiment 210 is similar to fourth embodiment 110, except that fifth embodiment 210 is provided with a spring member 226 having curved or arcuate locking surfaces 234 and 236. As will be described in greater detail below, the curved or arcuate locking surfaces 234 and 236 of spring member 226 increase the contact area of spring member 226 on thread crests 238 of externally-threaded member 220. The increased contact area may be used to increase the magnitude of the prevailing torque provided by a given spring member 226. Alternatively, the increased contact area may allow the prevailing torque developed by locknut 210 to remain the same, but with a smaller or less stiff spring member 226. In addition, in the fifth embodiment 210 the first end 214 of nut body 212 may be provided with a flange 252 which may be required or desired in certain applications. The pocket 224 defined by second end 216 of nut body 212 also has a slightly different configuration than the pocket 124 of fourth embodiment 110.

Figure 16:
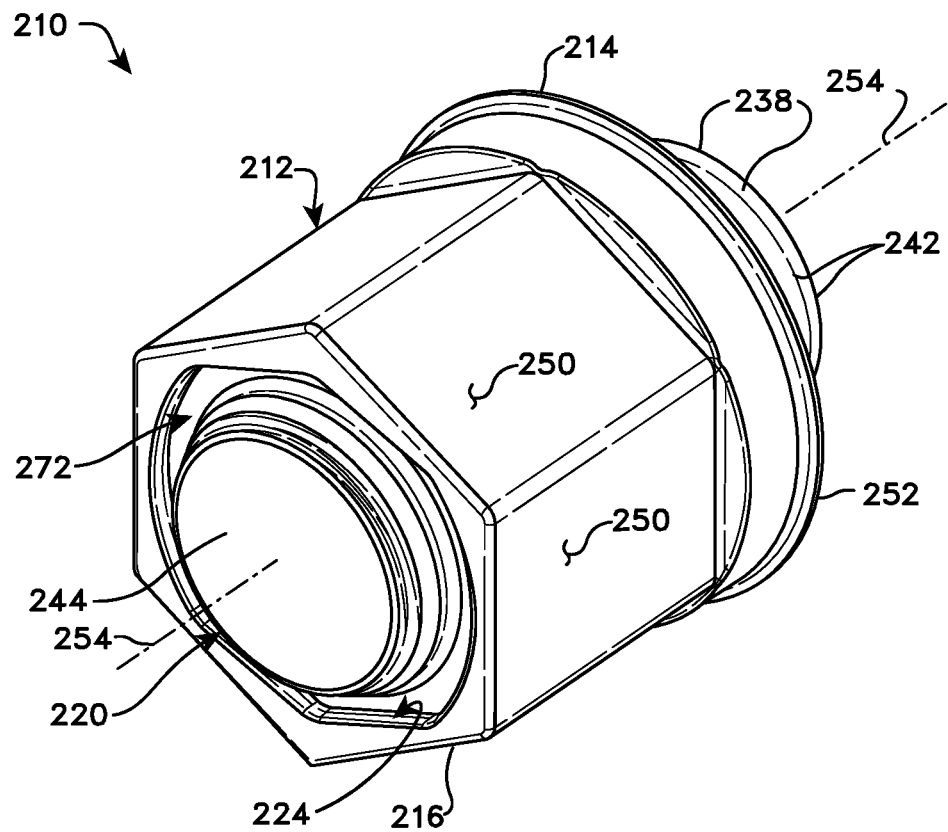
FIG. 16 is a perspective view of a fifth embodiment of a locknut according to the teachings provided herein.
Figure 17:
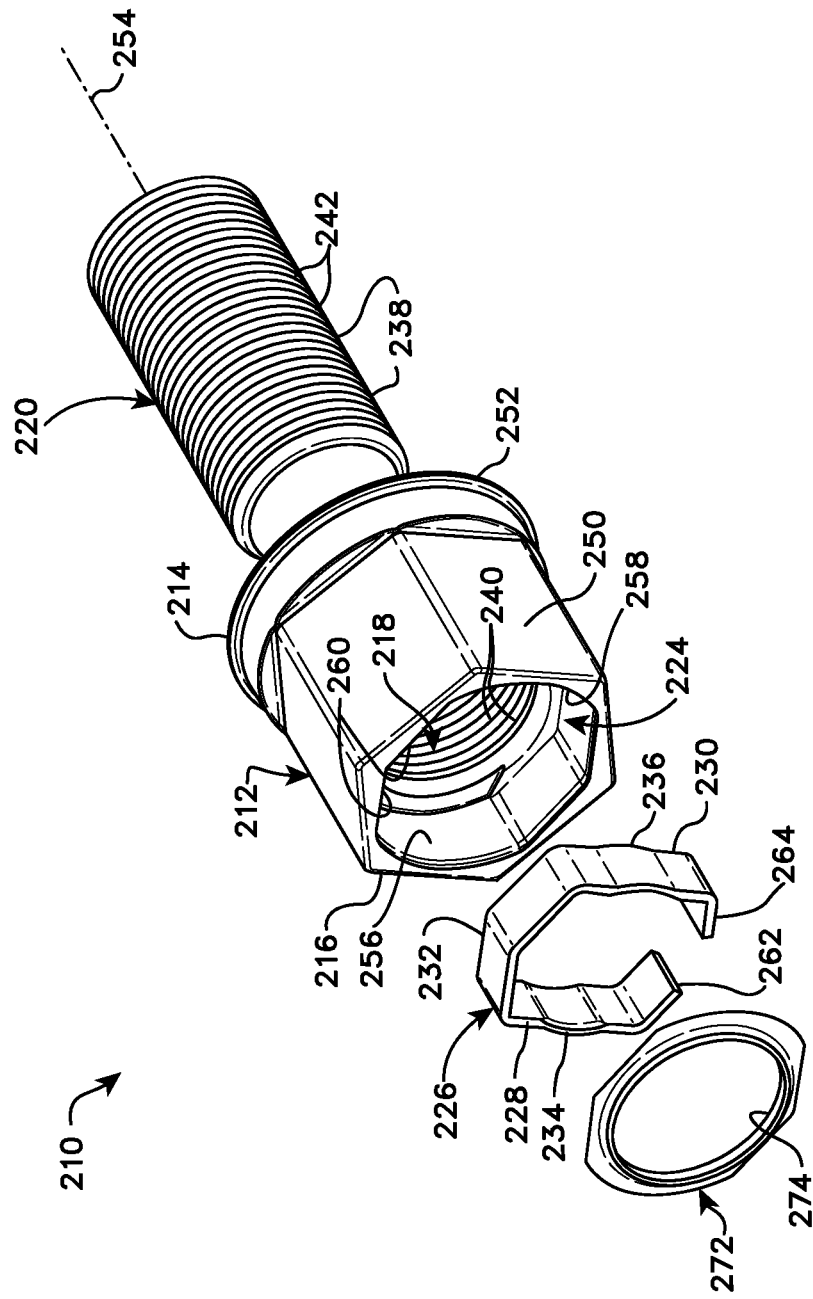
FIG. 17 is an exploded perspective view of the locknut illustrated in FIG. 16.

Referring now primarily to FIGS. 16 and 17, the fifth embodiment 210 of the locknut may comprise a nut body 212 having a first end 214 and a second end 216. Nut body 212 defines a threaded through opening 218 therein that is sized to receive externally-threaded member 220. Nut body 212 may define a plurality of faces or sides 250 to facilitate tightening or loosening of locknut 210. In the particular embodiments shown and described herein, nut body 212 may be generally hexagonally-shaped, defining six (6) sides 250, although nut body 212 may define a greater or fewer number of sides, as is well-known in the art. Therefore, and as was the case for the other embodiments, nut body 212 should not be regarded as limited to nut bodies defining any particular number of sides 250.

Depending on the particular application and intended use, the first end 214 of nut body 212 may be plain, flanged, or beveled. In the particular embodiment shown and described in FIGS. 16-20, first end 214 of locknut 210 is provided with a flange 252 thereon. Flange 252 may be integral to nut body 212 or may comprise a separate element, as is known.

Figure 18:
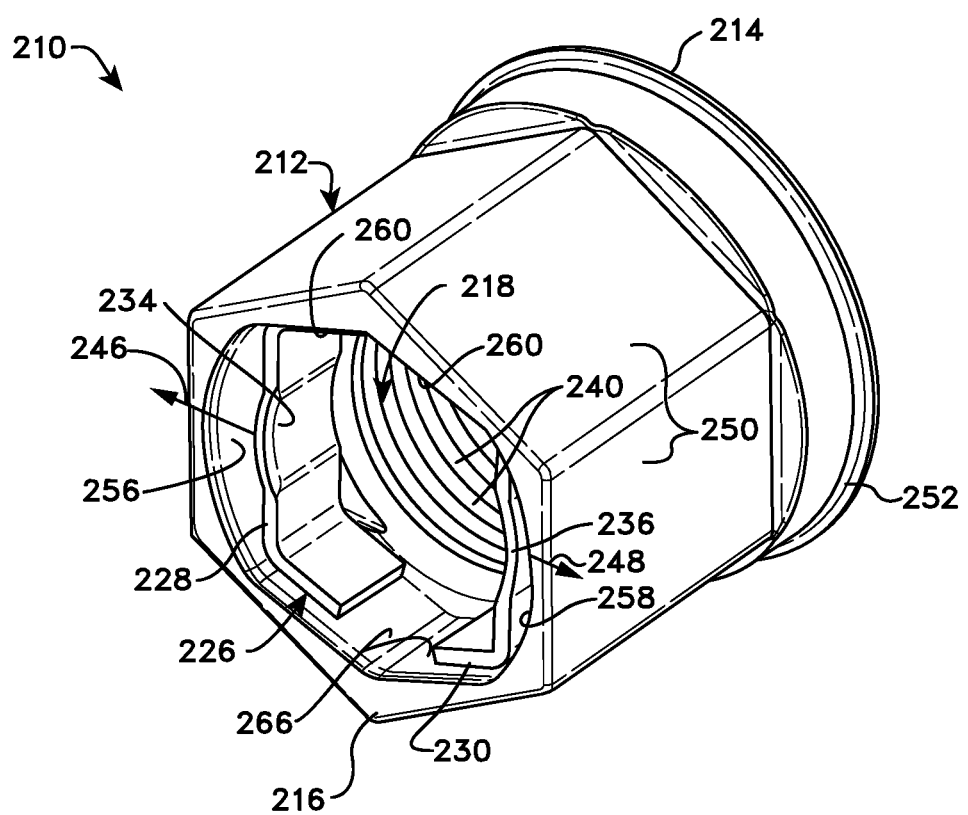
FIG. 18 is a perspective view of the locknut illustrated in FIG. 16 with the externally-threaded member and the shield member removed to more clearly show the details of the pocket and spring member having curved locking surfaces.
Figure 19:
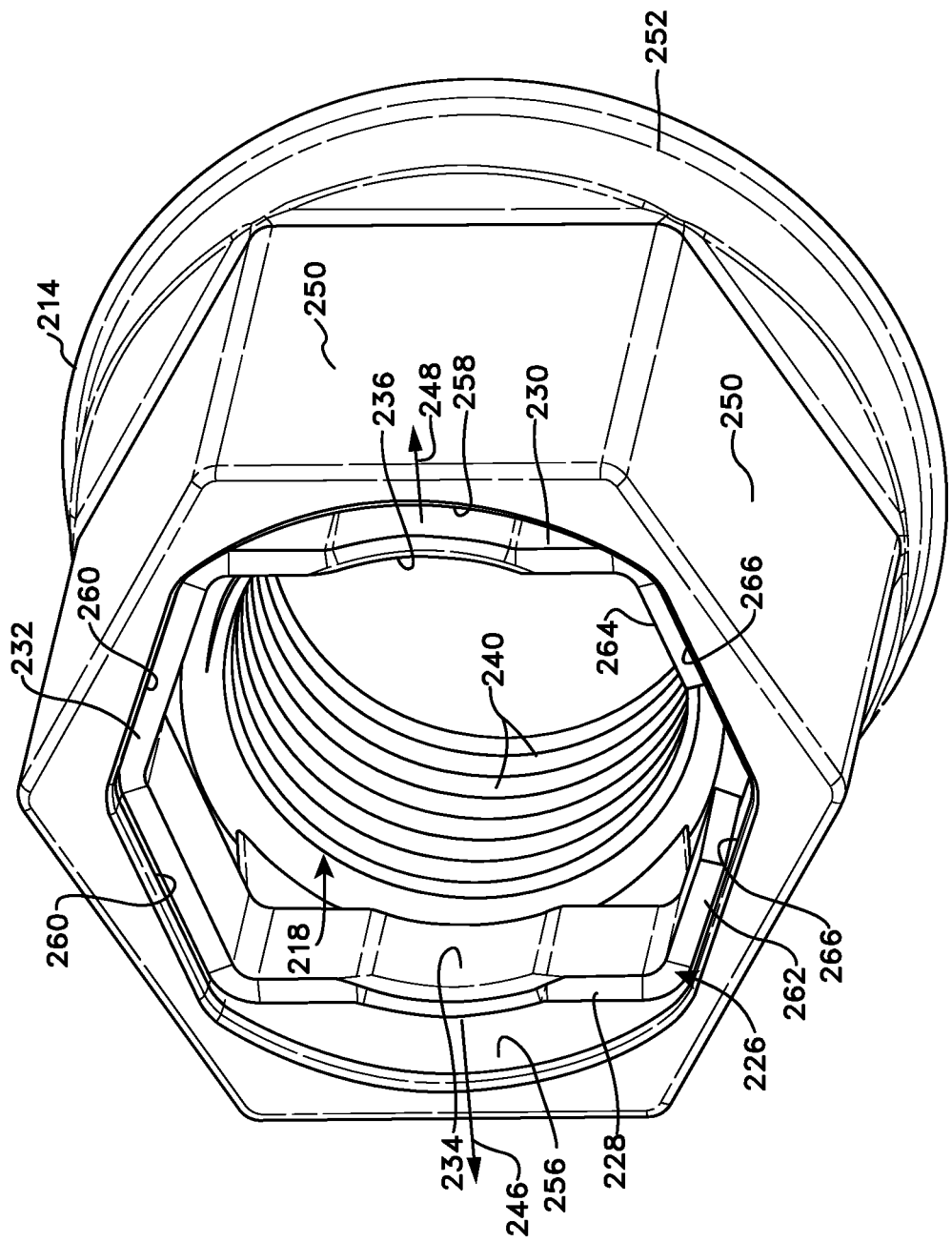
FIG. 19 is an perspective view of the locknut illustrated in FIG. 18 from a lower angle to more clearly show the engagement of the apex member with the mating surfaces defined by the pocket.

Referring now to FIGS. 17-19, second end 216 of nut body 212 defines pocket 224 that is sized to receive spring member 226. Pocket 224 is sized and configured not only to receive spring member 226 but also to maintain spring member 226 within pocket 224 so that the first and second leg members 228 and 230 are maintained in substantially parallel, spaced-apart relation with respect to a longitudinal axis 254 of externally-threaded member 220 when threaded member 220 is engaged with nut body 212. Pocket 224 may also be provided with a pair of arcuate or curved recessed areas 256 and 258 to allow the first and second leg members 228 and 230 of spring member 226 to be deflected generally outwardly, i.e., in the directions indicated by arrows 246 and 248, when externally-threaded member 220 is threaded into nut body 212. See FIGS. 18 and 19.

Pocket 224 is also sized to slidably receive and hold apex member 232 of spring member 226 against mating surfaces 260. The engagement of apex member 232 with mating surfaces 260 assists in retaining spring member 226 within pocket 224 and also assists in holding the first and second leg members 228 and 230 so that they remain in generally parallel-spaced apart relation to one another and to the longitudinal axis 254 of externally-threaded member 220.

In the particular embodiment illustrated in FIGS. 16-20, pocket 224 comprises a six-sided opening, with two sides, e.g., mating surfaces 260 and 266 comprising generally flat surfaces. Mating surfaces 260 and 266 are joined together by the curved or arcuate recessed areas 256 and 258, as best seen in FIG. 17.

As was the case for the other embodiments, nut body 212 may be manufactured from any of a wide range of materials, such as metals and metal alloys, that are well-known in the art or that may be developed in the future that are or would be suitable for the particular application. Nut body 212 may be manufactured from a suitable nut body "blank," such as wire or rod stock, in accordance with any of a wide range of fabrication processes, such as hot forming or cold forming processes (e.g., forging), that are well-known in the art or that may be developed in the future that are or would be suitable for forming nut body 112. Threads 240 may be formed in nut body 210 by any of a wide range of processes, such as cutting or rolling. Nut body 212 also may be provided with a suitable surface finish, plating, or coating, as may be desired or required.

Spring member 226 develops the locking force or prevailing torque required to maintain the engagement of the locknut 210 with threaded member 220, i.e., to prevent locknut 210 from unintentionally turning on externally-threaded member 220. Spring member 226 produces the prevailing torque by applying pressure to the thread crests 238 of externally-threaded member 220 at substantially opposed radial locations. Again, by applying pressure to only thread crests 238, locknut 210 avoids the risk of damaging the threads 242 of externally-threaded member 220, e.g., by spalling or brinelling, during engagement and disengagement of nut body 212. Contact only with thread crests 238 also avoids or minimizes the likelihood that the locknut 210 will adversely affect other structural attributes of externally-threaded member 220, such as yield strength or fatigue resistance.

As briefly mentioned earlier, the first and second leg members 228 and 230 of spring member 226 define curved or arcuate locking surfaces 234 and 236, as best seen in FIGS. 17 and 18-20. In the particular embodiment shown and described herein, the arcuate sections of locking surfaces 234 and 236 have inside diameters (i.e., curvatures) that are about equal to the outside or major diameter (i.e., curvature) of the externally-threaded member 220. So matching the curvatures of the arcuate sections of locking surfaces 234 and 236 with the curvature of threaded member 220 will provide substantially uniform contact between locking surfaces 234 and 236 and the thread crests 238 of threads 242 of threaded member 220. Alternatively, other inside diameters for curved or arcuate locking surfaces 234 and 236 could be used as well, depending on the particular application and desired magnitude of the prevailing torque that is to be developed, as would become apparent to persons having ordinary skill in the art after having become familiar with the teachings provided herein. Consequently, the disclosed instrumentalities should not be regarded as limited to curved or arcuate locking surfaces 234 and 236 having any particular inside diameters or curvatures.

First and second leg members 228 and 230 are joined together by an apex member 232. The arrangement is such that at least portions of the first and second leg members 228 and 230 are disposed in substantially parallel, spaced-apart relation to one another, although due to their curved or arcuate configuration, locking surfaces 234 and 236 are not parallel to one another.

As was the case for spring member 126, the spacing or distance between the first and second curved or arcuate locking surfaces 234 and 236 of spring member 226 will vary depending on the particular size, i.e., diameter, of threaded member 220. It will also vary depending on the stiffness of spring member 226 and the desired magnitude of the prevailing torque that is to be provided. Consequently, the disclosed instrumentalities should not be regarded as limited to any particular spacing or distance between the first and second curved or arcuate locking surfaces 234 and 236.

Also in a manner similar to spring member 126, spring member 226 may also comprise a first end member 262 extending from the first leg member 228 and a second end member 264 extending from second leg member 230. First and second end members 262 and 264 are sized to be slidably received by mating surfaces 266 provided in pocket 226, as best seen in FIGS. 18 and 19. The engagement of first and second end members 262 and 264 with mating surfaces 266 assists in retaining spring member 226 within pocket 224 and also in holding the first and second leg members 228 and 232 of spring member 226 so that they remain in generally parallel-spaced apart relation to one another and to the longitudinal axis 254 of threaded member 220 when threaded member 220 is threaded into nut body 212.

With reference now primarily to FIG. 20, the first and second locking surfaces 234 and 236 of spring member 226 are provided with respective relieved edge portions 268 and 270. The relieved edge portions 268 and 270 provide a lead-in for externally-threaded member 220. As was described above, provision of a suitable lead-in promotes the smooth and even elastic deflection of the first and second curved or arcuate locking surfaces 234 and 236 as externally-threaded member 220 is threaded into nut body 212. Relieved edge portions 268 and 270 also reduce the tendency of the spring member 226 to bind or otherwise be moved out of position or deformed during the engagement process. The lead-in provided by the relieved edge portions 268 and 270 therefore allows for the rapid threading and un-threading of nut body 212 on threaded member 220. In the particular embodiment shown in FIGS. 16-20, the relieved edge portions 268 and 270 comprise bevels or chamfers. In other embodiments, the relieved edge portions 268 and 270 may comprise radiused sections, as was the case for spring member 126. See FIG. 15. Regardless of how the relieved edge portions 268 and 270 are provided, it is generally preferred, but not required, to provide them on both sides of spring member 226 so that either side of spring member 226 may be inserted first into pocket 224.

Spring member 226 may be axially retained within pocket 224 by mechanically deforming (e.g., by swaging or staking) at least portions of the second end 216 of nut body 212. Alternatively, in some embodiments, locknut 210 may also comprise a shield member 272 sized to be received by pocket 224. See FIGS. 16 and 17. Shield member 272 may define a central opening 274 therein sized to pass distal end 244 of externally-threaded member 220. If provided, shield member 272 axially retains spring member 226 within pocket 224. Shield member 272 itself may be retained within pocket 224 by mechanically deforming (e.g., by swaging or staking) at least portions of the second end 216 of nut body 212.

Spring member 226 may be fabricated from any of a wide range of materials, such as metals or metal alloys, suitable for the particular application and that would provide (e.g., after suitable heat treatment) the required elasticity. Consequently, the present invention should not be regarded as limited to spring members fabricated from any particular type of material.

As was the case for spring member 126, spring member 226 may be formed by any of a wide range of processes, such as hot forming and cold forming processes, and from any of a wide range of starting material blanks or forms (e.g., wire, rod, or flat stock). By way of example, in one embodiment, spring member 226 is formed from flat stock material. The relieved edge portions 268 and 270 of the curved or arcuate locking surfaces 234 and 236 are then beveled or chamfered to provide the desired lead-in function. If spring member 226 is formed by rolling wire or rod stock material, the relieved edge portions 268 and 270 of respective first and second locking surfaces 234 and 236 typically will be rounded or radiused, thereby providing the desired lead-in function without the need for a separate beveling or chamfering. If heat treatment is required or desired, spring member 226 may be heat treated after being formed (i.e., as a separate piece). Alternatively, spring member 226 may be heat treated along with nut body 212, after having been placed within pocket 224 of nut body 212.

Locknut 210 may be produced for fabricated by the same processes described above for locknut 110, e.g., by forming a nut body blank, which may comprise a length of wire or rod stock, into nut body 210 having the desired shape or configuration. Spring member 226 may be made from a spring body blank which may comprise a length of wire, rod, or flat stock. After spring blank is formed, it may be bent or formed into the shape or configuration shown in FIGS. 17-20. Thereafter, spring member 226 may be heat treated (if required or desired), either before being positioned within pocket 224 of nut body 212, or afterwards, if spring member 226 is desired to be heat treated along with nut body 212. Again, and in any event, after spring member 226 is positioned within pocket 224 of nut body 212, at least portions of second end 216 of nut body 212 may be mechanically deformed to axially retain spring member 226 within pocket 224. If a shield member 272 is provided, then shield member 272 may be positioned within pocket 224 of nut body 212 before mechanically deforming the second end 216 of nut body 212.

Unless defined otherwise, all technical and scientific terms used herein have the same meaning as commonly understood by persons having ordinary skill in the art to which the invention pertains. Although any methods and materials similar or equivalent to those described herein can be used in practice for testing of the present invention, the preferred materials and methods are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may have been presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A locknut for engaging an externally threaded member, comprising:
a nut body having a first and a second end, said nut body defining a threaded through opening therein sized to receive the externally threaded member, the second end of said nut body defining a pocket therein, the pocket comprising a first mating surface and a second mating surface, the second mating surface being disposed at an angle with respect to the first mating surface; and
a spring member disposed within the pocket, said spring member comprising at least a first leg member, a second leg member, a first end member extending from the first leg member, and a second end member extending from the second leg member, the first and second leg members joined together by an apex member so that at least portions of said first and second leg members are disposed in substantially parallel, spaced-apart relation to one another, and so that the apex member is received by the first and second mating surfaces of the pocket, the first and second leg members defining respective first and second locking surfaces so that when the externally threaded member is threaded into the threaded through opening defined by said nut body the externally threaded member contacts and elastically displaces the first and second locking surfaces of the first and second leg members and so that the first and second locking surfaces exert pressure on the externally threaded member at substantially opposed radial locations to develop a locking force between said nut body and the externally threaded member.

2. The locknut of claim 1, wherein the first and second locking surfaces comprise arcuate sections having inside diameters about equal to an outside diameter of the externally threaded member.

3. The locknut of claim 1, wherein the first and second locking surfaces contact only thread crests on the externally threaded member.

4. The locknut of claim 1, wherein the pocket defined by said nut body further comprises first and second protrusions, said first and second protrusions holding said spring member within the pocket so that the first and second leg members of said spring member are maintained in substantially parallel, spaced-apart relation with respect to a longitudinal axis of the externally threaded member when the externally threaded member is engaged with said nut body.

5. The locknut of claim 1, wherein said first and second end members do not contact the externally threaded member when the externally threaded member is engaged with said nut body.

6. The locknut of claim 1, wherein the pocket defined by the second end of said nut body comprises a third mating surface and a fourth mating surface, the fourth mating surface being disposed at an angle with respect to the third mating surface, the third and fourth mating surfaces being sized to receive the first and second end members of said spring member.

7. The locknut of claim 6, wherein the pocket defined by the second end of said nut body comprises a first arcuate surface and a second arcuate surface, the first arcuate surface extending between the first and third mating surfaces, the second arcuate surface extending between the second and fourth mating surfaces.

8. The locknut of claim 1, further comprising a shield member positioned within the pocket at a location between said spring member and the second end of said nut body.

9. The locknut of claim 1, wherein the first and second leg members of said spring member comprise respective first and second relieved edge sections located at about the first and second locking surfaces, said first and second relieved edge sections providing a lead-in for the externally threaded member as the externally threaded member is threaded into said nut body.

10. The locknut of claim 9, wherein the first and second relieved edge sections comprise radiused edge portions of the respective first and second leg members.

11. The locknut of claim 9, wherein the first and second relieved edge sections comprise beveled edge portions of the respective first and second leg members.

12. A method of making a lock nut for engaging an externally threaded member, comprising:
providing a nut body blank;
forming the nut body blank into a nut body, the nut body comprising: a first, a second end, and a threaded through opening therein sized to receive the externally threaded member, the second end of the nut body defining a pocket therein, the pocket comprising a first mating surface and a second mating surface, the second mating surface being disposed at an angle with respect to the first mating surface;

providing a spring member blank;

forming the spring member blank into a spring member comprising at least a first leg member, a second leg member, a first end member extending from the first leg member, and a second end member extending from the second leg member, the first and second leg members joined together by an apex member so that the first and second leg members are disposed in substantially parallel, spaced-apart relation to one another, the first and second leg members defining respective first and second locking surfaces; and positioning the spring member into the pocket so that the first and second mating surfaces comprising the pocket receive the apex member of the spring member and so that when the externally threaded member is threaded into the threaded through opening defined by the nut body the first and second locking surfaces of the spring member are elastically displaced and press against the externally threaded member at substantially opposed radial locations to develop a locking force between the nut body and the externally threaded member.

13. The method of claim 12, wherein said forming the nut body blank into the nut body comprises at least one process selected from the group comprising cold forming and hot forming.

14. The method of claim 12, wherein the threaded through opening is formed by at least one process selected from the group comprising thread rolling and thread cutting.

15. The method of claim 12, further comprising mechanically deforming at least a portion of the second end of the nut body to axially retain the spring member within the pocket.

16. The method of claim 15, wherein said mechanically deforming at least a portion of the second end of the nut body comprises one or more mechanical deformation processes selected from the group of swaging and staking.

17. The method of claim 12, further comprising heat treating the nut body and the spring member separately before said positioning the spring member into the pocket formed in the nut body.

18. The method of claim 12, further comprising heat treating the nut body and the spring member together after said positioning the spring member into the pocket formed in the nut body.

19. The method of claim 12, further comprising providing a surface treatment on the nut body before said positioning the spring member into the pocket formed in the nut body.

20. The method of claim 12, wherein said providing the nut body blank comprises providing a length of rod stock material.

21. The method of claim 12, wherein said providing the spring member blank comprises providing a length of wire stock material.

22. The method of claim 12, wherein said providing the spring member blank comprises providing a length of flat stock material.

\* \* \* \* \*